T. T. STRODE.
Excavators.
No. 152,882.
Patented July 7, 1874.
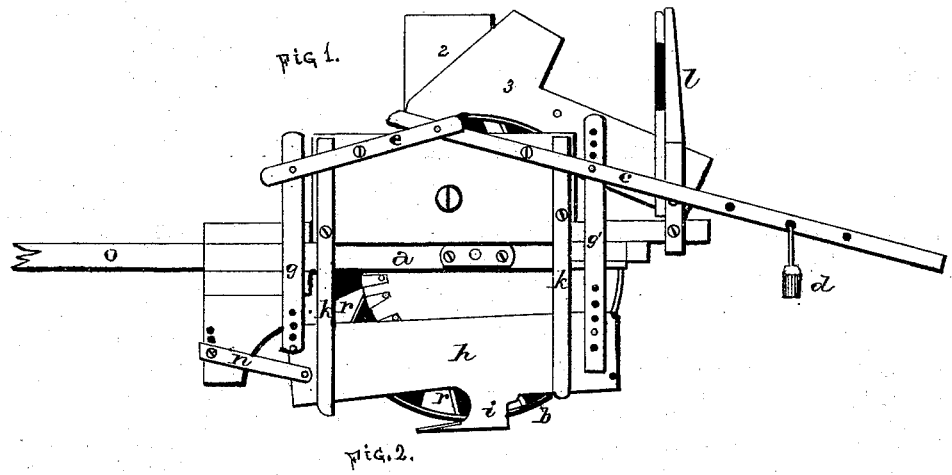
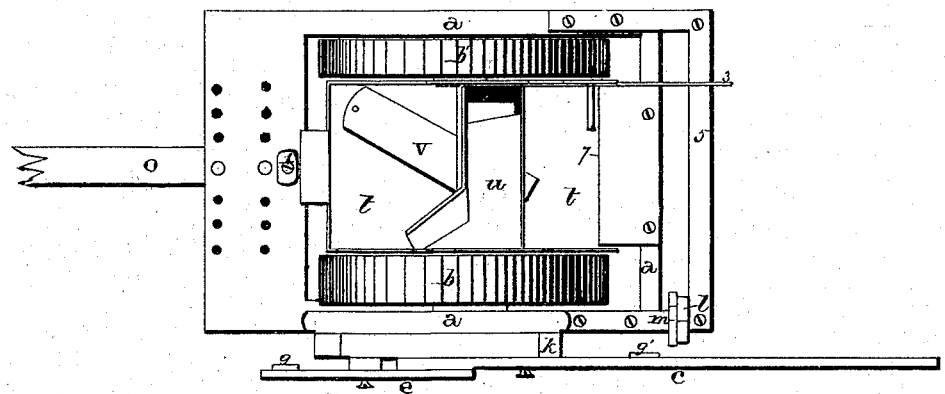
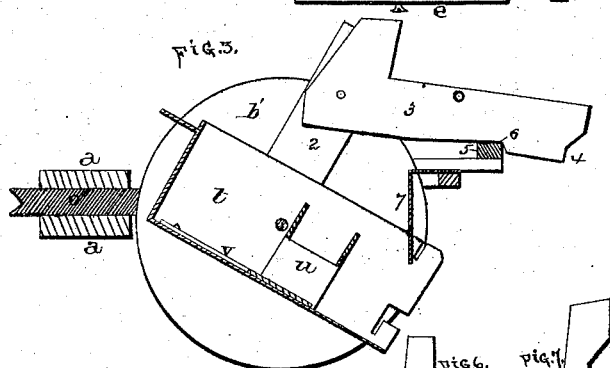
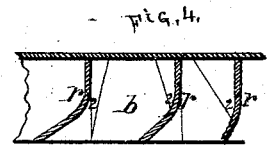
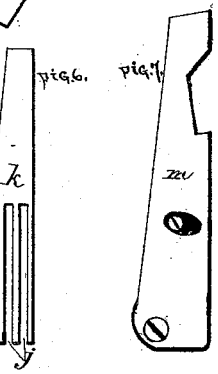
WITNESSES.
F. B. Townsend.
J. Wm Garner.
INVENTOR.
Thos. T. Strode
per
F. A. Lehmann, Atty

UNITED STATES PATENT OFFICE.

THOMAS T. STRODE, OF MORTONVILLE, PENNSYLVANIA.

IMPROVEMENT IN EXCAVATORS.

Specification forming part of Letters Patent No. 152,882, dated July 7, 1874; application filed June 11, 1874.

*To all whom it may concern:*

Be it known that I, THOMAS T. STRODE, of Mortonville, in the county of Chester and State of Pennsylvania, have invented certain new and useful Improvements in Machines for Grading, Loading, Moving, and Transporting Earth; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in machines for grading, loading, moving, and transporting earth; and it consists in the arrangement and combination of levers for operating the plow. It further consists in making a hole through the bottom of the bed, and so placing a chute that it will receive the earth as it is discharged from the wheel, and convey it to this opening, for the purpose of moving the earth from one side to the other. It also consists in a peculiar-shaped lever, by means of which the bed is locked in a horizontal position, or held inclined backward, so as to dump its load. It also consists in the arrangement and combination of devices which be more fully described hereafter.

The accompanying drawing represents my invention.

*a* represents an ordinary rectangular frame of any desired construction, which is supported by the two wheels *b b'*. To one side of this frame is pivoted the long lever *c*, having a series of holes made in its outer end, so that the weight *d* can be adjusted back and forth, as may be found necessary, and which has its other end movably attached to a second lever, *e*, by means of a slot and stud. The lever *e* is also pivoted to the side of the frame, and has attached to its front end the lifting-bar *g*, which has a series of holes made through both its ends, so that it can be adjusted up and down at pleasure. The lower ends of the bar, and a similar one, *g¹*, attached to the lever *c*, are pivoted to the plate *h*, to which the plow *i* is fastened. This plate moves up and down in the slots *j*, made in the vertical guides *k*, for the purpose of raising and lowering the plow. There may either be several of these slots, so that the plow may be moved out away from the wheel, in case the ground is very stony; or there may be but a single slot, and then the guides be made to move outward by any suitable devices, and thus accomplish the same result. Eccentrically pivoted to a standard, *l*, on the rear end of the frame is a slotted notched catch, *m*, which, when the lever is raised upward, falls forward and catches under the lever, and thus holds the plow raised up above the earth. When the lever is down, the weight forces the plow into the earth. The front end of the plate *h* has attached to it a draft-rod, *n*, by means of which the plow is drawn straight forward by the frame, and thus all strain is taken off of the levers. As the draft of the machine will be thrown on one side, on account of the plow, the front end of the frame, in which the tongue *o* is placed, is provided with a series of holes, by means of which the tongue can be shifted from side to side, so as to make the draft as direct as possible. The wheel *b*, which carries up the earth, consists of a central hub and an outer rim, which are connected together by the buckets *r*, the rim being turned at right angles on the inner side, so as to form a wall, against which the dirt is thrown as it enters the buckets. These buckets extend straight across the edge of the hub from the inner edge to the point 2, and then they curve forward to the outer edge, as shown in Fig. 4, these outward-curved ends serving to retain and hold the dirt in the wheel as it is carried upward to discharge into the bed. The curve of these buckets may be varied somewhat, as it is only necessary that the ends of the buckets be so formed as to prevent the dirt from falling out, they being narrower at the receiving than at the discharging point. The inner edge of the hub is beveled away so as to form an incline, down which the dirt will slide into the bed *t*, and the outer edge of the buckets are bent, as shown, so as to receive and retain the dirt to the best advantage.

It will be noticed that the buckets open on both sides of the wheel, and as the plow throws the dirt in on the outside it is discharged into the bed from the inside. By this arrangement, and having the rim turned down on the inside so as to form a supporting-wall for the dirt to rest against, almost all friction and wear of the parts, by the rubbing of the dirt as it is raised upward, is entirely avoided, and the draft greatly lightened on the team. As the plow is drawn forward, the revolution of the wheel $b$ brings the buckets as if to meet it, and the earth is taken directly in just as it is loosened.

When it is desired to transport the earth away from where it is cut, it is simply emptied into the bed until the bed is filled, and then it is hauled away and dumped; but where it is not desired to transport it away, but to simply move it to one side and discharge it as the machine is driven along, a chute, $u$, having suitable catches on its upper end to hold it in place, is adjusted across the bed, into which all the dirt falls as it is emptied from the wheel. This chute conducts this earth to a hole made in the bottom of the bed, through which it is discharged, the hole being usually kept closed by the pivoted cover $v$.

The bed $t$ is pivoted upon the axle or any other suitable devices, so that it can be freely tilted backward for the purpose of discharging its load in the usual manner, and which can be held in a horizontal position by the catch 1 on the front end of the machine. Projecting up from the side of the bed is a lever or standard, 2, to which is pivoted the operating-lever 3. This lever has one notch, 4, formed in its rear end, which catches against the front edge of the driver's seat 5, and holds the bed in a horizontal position. By raising this lever upward and freeing the notch 4, the bed can be tilted back until the notch 6 in the lower edge of the lever catches over the rear edge of the seat, and the bed is held in this inclined position. The driver, sitting on the seat 5, can operate the lever for raising and lowering the plow, and the one for dumping the wagon-bed, with the greatest ease. Rigidly secured to the frame is the tail-board 7, shown in Fig. 3, which always remains stationary while the bed is raised up and down. When the bed is tilted down its rear end is open; but as soon as it is raised into position it is closed.

After the plow has cut its first furrow, the wheel $b$ will be made to run in this furrow, and thus be just on a level with the lower edge of the plow, so as to receive the dirt directly from it without the plow having to raise the dirt upward. Where the plow is placed inside of the wheel, as is usually the case, the wheel cannot run in the furrow, and consequently the plow must raise the dirt up to it.

Having thus described my invention, I claim—

1. The combination of the levers $c\ e$, bars $g\ g'$, plate $h$, carrying the plow $i$, catch $m$, and guides $k$, substantially as set forth.

2. The guides $k$, having a series of slots, $j$, so that the plate $h$ and plow $i$ can be laterally adjusted in relation to the wheel $b$, substantially as described.

3. The combination of the bed $t$, having an opening through its bottom, pivoted cover $v$, chute $u$, and the wheel $b$, substantially as shown.

4. The combination of the tilting-bed $t$, standard 2, lever 3, and driver's seat 5, substantially as shown.

5. The combination of the plate $h$ and draft-bar $n$, substantially as specified.

6. The buckets $r$, having their outer receiving ends curved forward from the point 2 to the outer edge of the wheel, so as to be narrower at the receiving than the discharging point, and to retain the earth, constructed substantially as specified.

In testimony that I claim the foregoing I have hereunto set my hand this 11th day of June, 1874.

THOMAS T. STRODE.

Witnesses:
   FRED. A. LEHMANN,
   FRANK CLAUDY.